US012786797B2

(12) United States Patent
Fujishiro

(10) Patent No.: US 12,786,797 B2
(45) Date of Patent: Nov. 3, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 293 days.

(21) Appl. No.: 18/431,709

(22) Filed: Feb. 2, 2024

(65) Prior Publication Data

US 2024/0179571 A1 May 30, 2024

Related U.S. Application Data

(63) Continuation of application No. PCT/JP2022/029637, filed on Aug. 2, 2022.

(30) Foreign Application Priority Data

Aug. 4, 2021 (JP) ................................ 2021-128614

(51) Int. Cl.
*H04W 28/12* (2009.01)

(52) U.S. Cl.
CPC .................................. *H04W 28/12* (2013.01)

(58) Field of Classification Search
None
See application file for complete search history.

(56) References Cited

U.S. PATENT DOCUMENTS 11,510,131 B2 * 11/2022 Zhu ....................... H04W 40/24
2020/0267795 A1 8/2020 Jung et al.
2021/0092667 A1 * 3/2021 Zhu ....................... H04W 40/24

FOREIGN PATENT DOCUMENTS

WO 2019/214747 A1 11/2019

OTHER PUBLICATIONS

3rd Generation Partnership Project; Technical Specification Group Radio Access Network; NR; NR and NG-RAN Overall Description; Stage 2 (Release 16); 3GPP TS 38.300 V16.6.0; Jun. 2021; pp. 1-152.
Huawei; "(TP for NR-IAB BL CR for TS 38.425): E2E flow control for IAB network"; 3GPP TSG-RAN WG3 Meeting #107-e; R3-200757; E-meeting; Feb. 24-Mar. 6, 2020; pp. 1-8.

* cited by examiner

*Primary Examiner* — Willie J Daniel, Jr.
(74) *Attorney, Agent, or Firm* — Studebaker Brackett PLLC

(57) ABSTRACT

In a first aspect, a communication control method is used in a cellular communication system. The communication control method includes transmitting, by a relay node to a donor node, first information collected upon transmission of flow control feedback message or second information collected upon reception of the flow control feedback message. The communication control method includes receiving, by the donor node, the first information or the second information.

3 Claims, 9 Drawing Sheets

COMMUNICATION CONTROL METHOD

RELATED APPLICATIONS

The present application is a continuation based on PCT Application No. PCT/JP2022/029637, filed on Aug. 2, 2022, which claims the benefit of Japanese Patent Application No. 2021-128614 filed on Aug. 4, 2021. The content of which is incorporated by reference herein in their entirety.

TECHNICAL FIELD

The present disclosure relates to a communication control method used in a cellular communication system.

BACKGROUND OF INVENTION

The Third Generation Partnership Project (3GPP), which is a standardization project of a cellular communication system, has been studying introduction of a new relay node referred to as an Integrated Access and Backhaul (IAB) node. One or more relay nodes are involved in communication between a base station and a user equipment and perform relay for the communication.

CITATION LIST

Non-Patent Literature

Non-Patent Document 1: 3GPP TS 38.300 V16.6.0(2021-06)

SUMMARY

In a first aspect, a communication control method is used in a cellular communication system. The communication control method includes transmitting, by a relay node to a donor node, first information collected upon transmission of flow control feedback message or second information collected by the relay node upon reception of the flow control feedback message. The communication control method includes receiving, by the donor node, the first information or the second information.

In a second aspect, a communication control method is used in a cellular communication system. The communication control method includes transmitting, by a relay node to a donor node, third information collected upon reception of a notification relating to a failure of a backhaul link from a parent node of the relay node and fourth information collected upon transmission of the notification to a child node of the relay node. The communication control method includes receiving, by the donor node, the third information and the fourth information.

DESCRIPTION OF EMBODIMENTS

An object of the present disclosure is to appropriately collect a log and transmit the collected log to a donor node.

A cellular communication system in an embodiment is described with reference to the drawings. In the description of the drawings, the same or similar parts are denoted by the same or similar reference signs.

Configuration of Cellular Communication System

A configuration example of the cellular communication system according to an embodiment is described. In an embodiment, a cellular communication system 1 is a 3GPP 5G system. Specifically, a radio access scheme in the cellular communication system 1 is New Radio (NR) being a 5G radio access scheme. Note that Long Term Evolution (LTE) may be at least partially applied to the cellular communication system 1. A future cellular communication system such as 6G may be applied to the cellular communication system 1.

Figure 1:
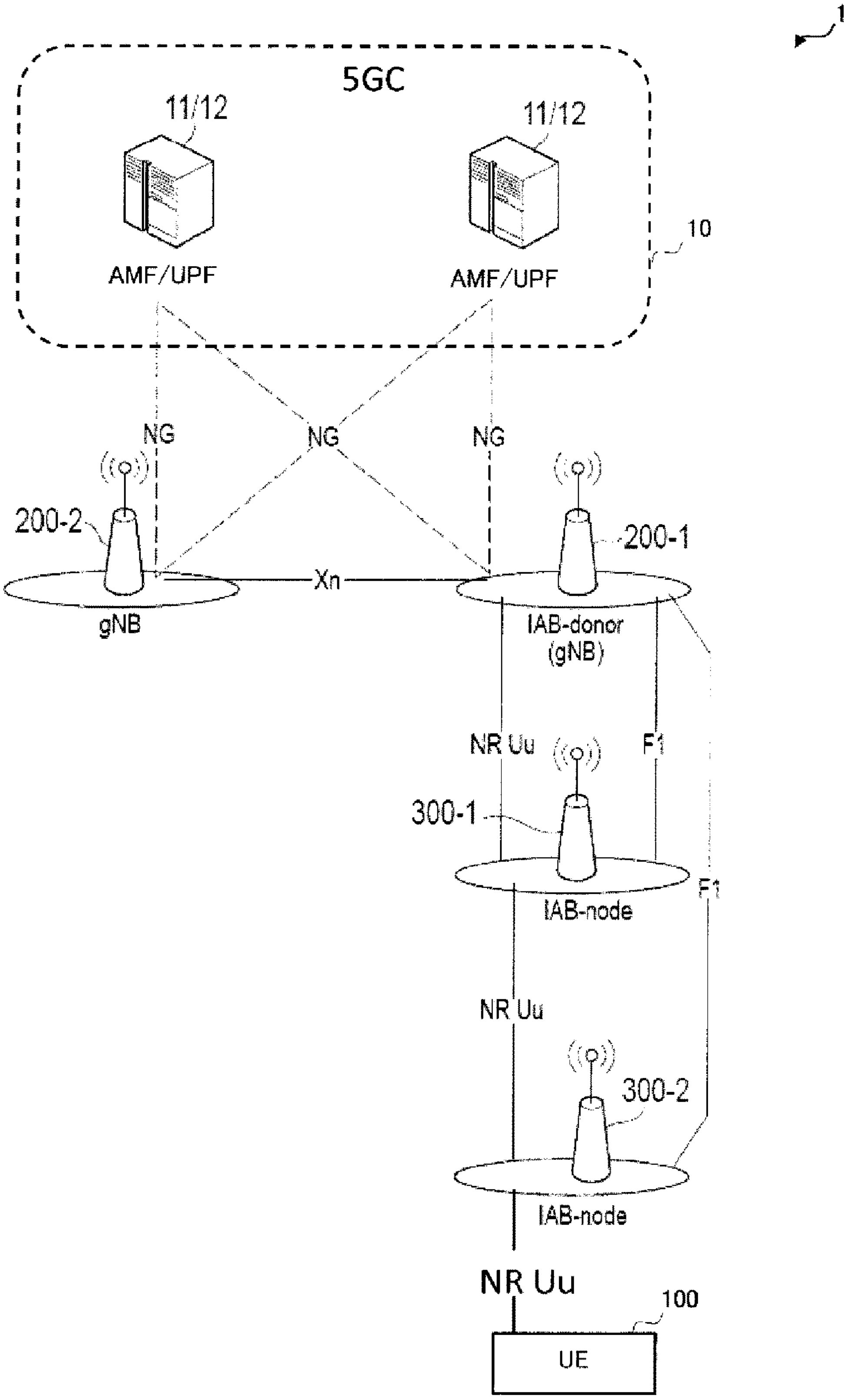
FIG. 1 is a diagram illustrating a configuration example of a cellular communication system according to an embodiment.

FIG. 1 is a diagram illustrating a configuration example of the cellular communication system 1 according to the embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency. Hereinafter, the cell and the base station may be used without distinction.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB 200-1 (or the donor node, hereinafter also referred to as the "donor node" in some cases) is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the IAB node 300-1 is wirelessly connected to the donor node 200-1, the IAB node 300-2 is wirelessly connected to the IAB node 300-1, and the F1 protocol is transmitted in two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 includes a mobile phone terminal or a tablet terminal, a laptop PC, a sensor or an apparatus that is provided in a sensor, a vehicle or an apparatus that is provided in a vehicle, and an aircraft or an apparatus provided in an aircraft. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor node 200-1 via the IAB node 300-2 and the IAB node 300-1.

Figure 2:
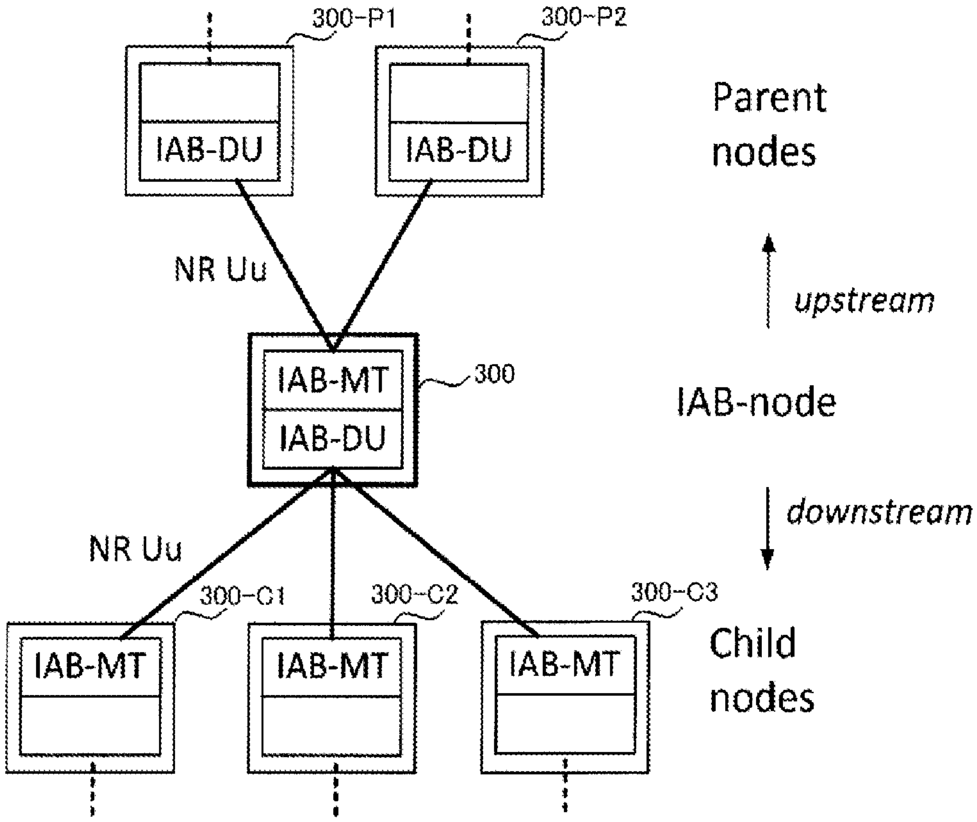
FIG. 2 is a diagram illustrating a relationship between an IAB node, parent nodes, and child nodes.

FIG. 2 is a diagram illustrating a relationship example between the IAB node 300, parent nodes, and child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor node 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor node 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

Configuration of Base Station

Figure 3:
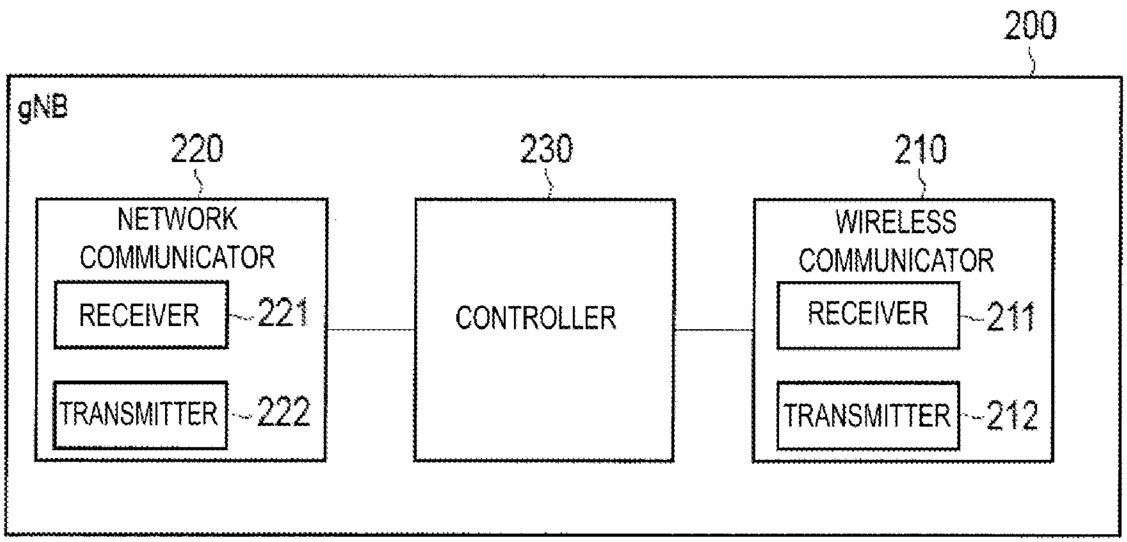
FIG. 3 is a diagram illustrating a configuration example of a gNB (base station) according to the embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then transmitted to the controller 230. The transmitter 212 performs various types of transmission under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 230 may perform all of the processing in the gNB 200 in each embodiment described below.

Configuration of Relay Node

Figure 4:
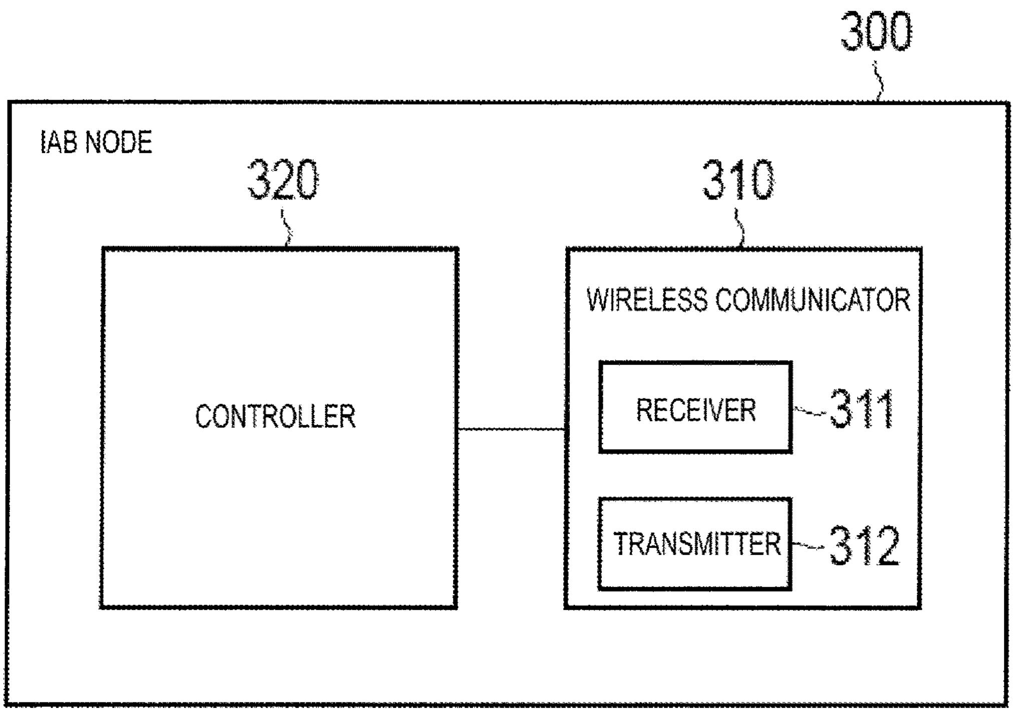
FIG. 4 is a diagram illustrating a configuration example of an IAB node (relay node) according to the embodiment.

A configuration of the IAB node 300 that is a relay node (or a relay node apparatus, which is also referred to as a relay node below in some cases) in the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then transmitted to the controller 320. The transmitter 312 performs various types of transmission under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each embodiment, the controller 320 may perform each of the processing operations or the operations in the IAB node 300.

Configuration of User Equipment

Figure 5:
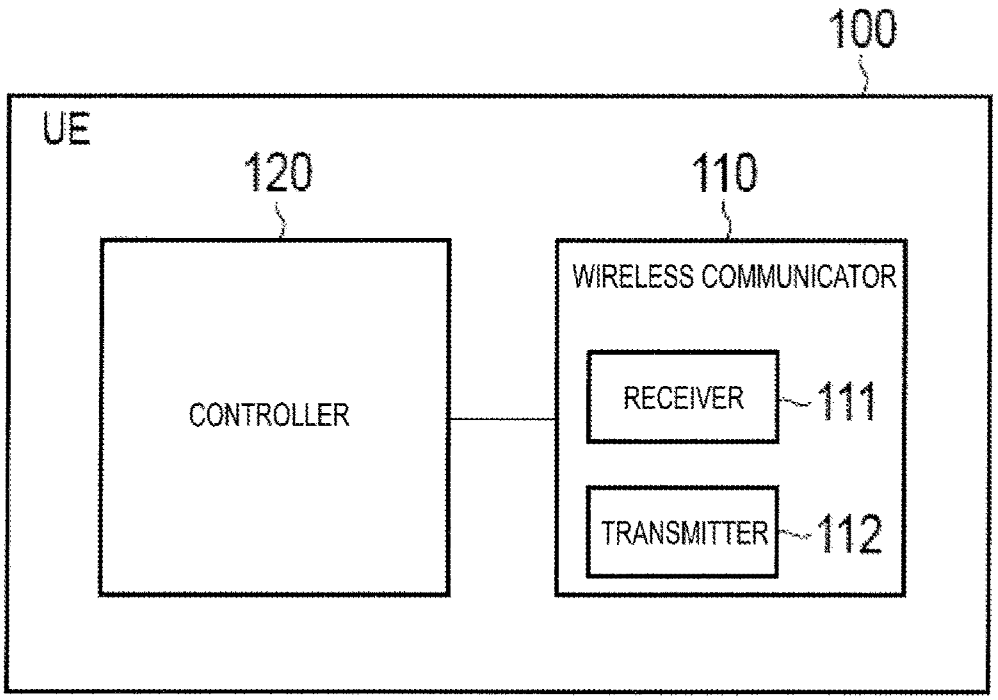
FIG. 5 is a diagram illustrating a configuration example of a UE (user equipment) according to the embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link. i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 130 may perform each of the processing operations in the UE 100 in each embodiment described below.

Configuration of Protocol Stack

Figure 6:
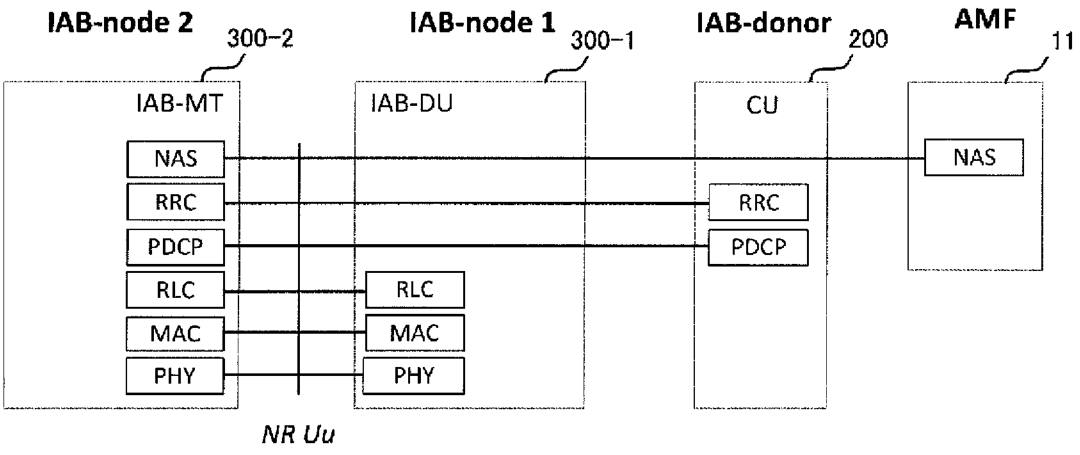
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, Modulation and Coding Schemes (MCSs)) in the uplink and the downlink and allocated resource blocks.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor node 200 via a radio bearer.

The RRC layer controls a logical channel, a transport channel, and a physical channel according to establishment, re-establishment, and release of a radio bearer. RRC signaling for various configurations is transmitted between the RRC layer of the IAB-MT of the IAB node 300-2 and the RRC layer of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned upper than the RRC layer performs session management, mobility management, and the like. NAS signaling is transmitted between the NAS layer of the IAB-MT of the IAB node 300-2 and the AMF 11.

Figure 7:
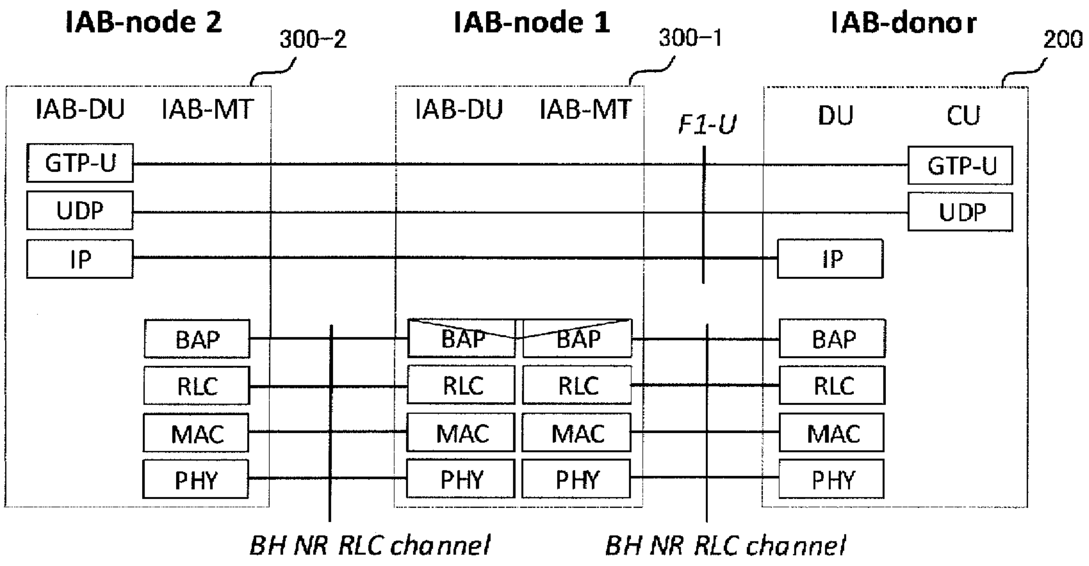
FIG. 7 is a diagram illustrating an example of a protocol stack related to an F1-U protocol.
Figure 8:
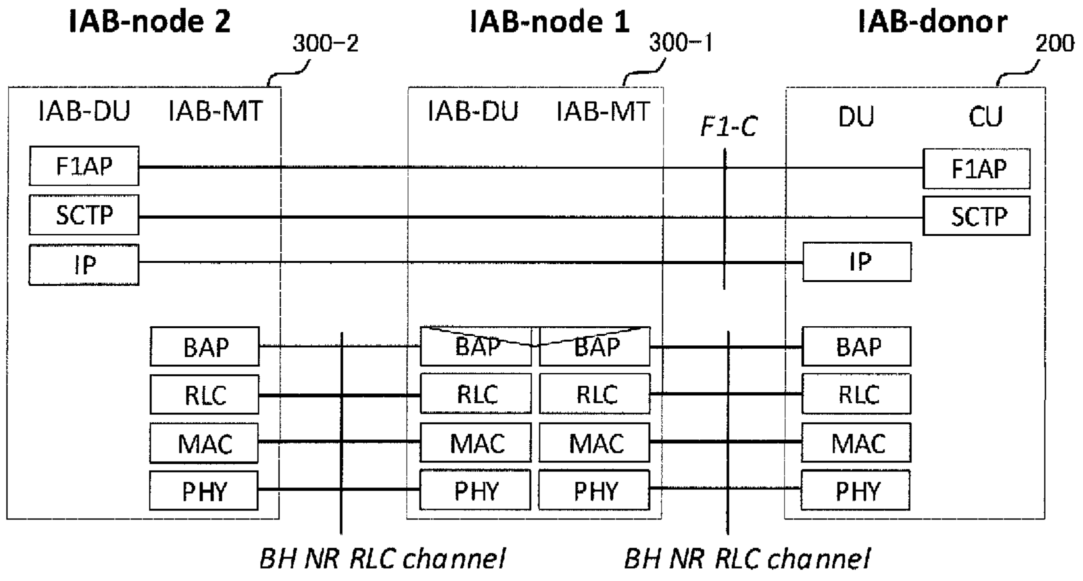
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. An example is illustrated in which the donor node 200 is divided into a CU and a DU.

As illustrated in FIG. 7, each of the IAB-MT of the IAB node 300-2, the IAB-DU of the IAB node 300-1, the IAB-MT of the IAB node 300-1, and the DU of the donor node 200 includes a Backhaul Adaptation Protocol (BAP) layer as a higher layer of the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring multiple backhaul RLC channels in each BH link enables the prioritization and Quality of Service (QOS) control of traffic. The association between the BAP PDU and the backhaul RLC channel is executed by the BAP layer of each IAB node 300 and the BAP layer of the donor node 200.

As illustrated in FIG. 8, the protocol stack of the F1-C protocol includes an FIAP layer and an SCTP layer instead of a GTP-U layer and a UDP layer illustrated in FIG. 7.

Note that in the description below, processing or operation performed by the IAB-DU and the IAB-MT of the IAB may be simply described as processing or operation of the "IAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the donor node 200 may be described simply as processing or operation of the "donor node".

An upstream direction and an uplink (UL) direction may be used without distinction. A downstream direction and a downlink (DL) direction may be used without distinction.

First Embodiment

A first embodiment will be described.

First, Self Organizing/Optimizing Network (SON) and Minimization of Drive Tests (MDT) in the first embodiment will be described.

SON and MDT

In the cellular communication system 1, there are a large number of nodes including the base station 200. Accordingly, the cellular communication system 1 may require high operational costs related to management of the nodes.

The SON is a concept that has been introduced to reduce such operational costs. The SON is a technique for autonomously organizing or optimizing networks. Specifically, the SON is a technique for achieving continuous optimization responding to a dynamic change of a network, optimization of parameters associated with troubleshooting, optimization of coverage and capacity, and the like.

Such functions of the SON are used to automate processes such as planning, configuration, and optimization of a network, thus reducing work of an operator (communication carrier) and operational costs. Note that the algorithm of the SON itself is not specified in 3GPP. In other words, the algorithm of SON is implementation dependent. For example, there is an algorithm of the SON as described below. A series of operations is automatically performed that includes obtaining, as input data, measurement data of a wireless environment and the implementation status of various communication protocols (for example, success/failure of handover processing), calculating optimum values for a network facility (for example, an antenna tilt angle of a base station) by computer simulation using the input data, and configuring the network facility with the optimum values.

On the other hand, a radio condition (coverage area) is measured when the base station 200 is installed. Such measurement is performed by running a measuring vehicle (or an electric measuring vehicle) on which measuring equipment is mounted. Then, based on measurement results, optimization is performed by changing the antenna tilt of the base station or the like, and subsequently the electric measuring vehicle is run again to confirm the effect of the optimization. As described above, a large number of man-hours and high costs are required to perform drive tests for actually measuring the radio condition and collecting measurement data.

In view of these, the MDT was introduced. The MDT is a technique that supports collection of measurements specific to the UE 100. The MDT allows measurement date collected in the drive tests by the electric measuring vehicle to be collected by using the UE 100. Accordingly, measurement and collection can be automated, reducing the man-hours and costs.

The MDT has two modes: logged MDT and immediate MDT. In the log MDT, the UE 100 in the idle state or inactive state, instead of logging measurement results, in other words, immediately reporting the measurement results to the base station 200, reports the log to the base station 200 (in response to a request from the base station 200) after obtaining the measurement results. On the other hand, in the immediate MDT, the UE 100 in the connected state performs measurement based on an RRC configuration and a reporting procedure related to the measurement.

Communication Control Method According to First Embodiment

Figure 9A:
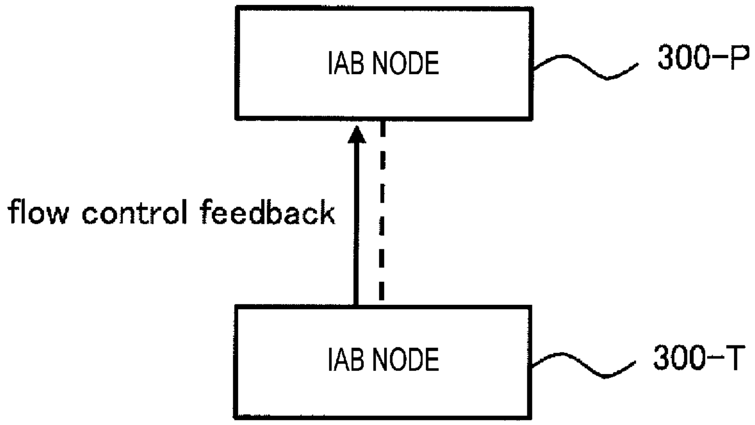
FIG. 9A and FIG. 9B are diagrams illustrating examples of flow control feedback according to a first embodiment.

FIG. 9A is a diagram illustrating an example of flow control feedback according to the first embodiment. FIG. 9A illustrates an example of flow control feedback in the downstream direction.

The flow control in the downstream direction is supported in the BAP layer of the IAB node 300. The (BAP entity of the) IAB-MT of the IAB node 300-T triggers flow control feedback when buffer loads exceed a certain level. Alternatively, the IAB-MT of the IAB node 300-T triggers flow control feedback upon receiving flow control polling from the parent node 300-P of the IAB node 300-T. Upon triggering the flow control feedback is triggered, the IAB-MT of the IAB node 300-T generates flow control feedback including an available buffer size and the like. The IAB-MT of the IAB node 300-T transmits the generated flow control feedback to the parent node 300-P. The flow control feedback is transmitted using a BAP Control PDU. In response to receiving the flow control feedback, the parent node 300-P may, for example, reduce the amount of data transmitted to the IAB node 300-T (in the downstream direction) or refrain from the transmission itself. This allows buffer overflow in the IAB node 300-T to be suppressed. The buffer overflow is a phenomenon in which the data received from the parent node 300-P fails to be transferred (transmitted) to the child node in the IAB node 300-T, and remains held in the buffer (memory) of the IAB node 300-T, causing the data for accumulation to exceed the buffer size eventually. The parent node 300-P reduces the amount of data transmitted to the IAB node 300-T or refrains from the transmission itself, thus enabling such buffer overflow to be suppressed. Congestion between the IAB node 300-P and the IAB node 300-T can be suppressed.

In the 3GPP, such downstream flow control has been specified. On the other hand, the 3GPP is currently studying flow control in the upstream direction.

Figure 9B:
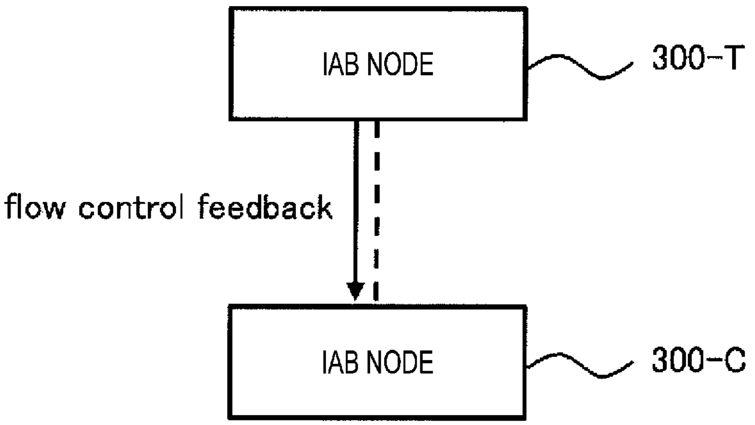

FIG. 9B is a diagram illustrating an example of flow control feedback according to the first embodiment. FIG. 9B illustrates an example of flow control in the upstream direction.

As illustrated in FIG. 9B, the IAB node 300-T transmits flow control feedback to the child node 300-C of the IAB node 300-T. In response to receiving the flow control feedback, the child node 300-C can transmit a reduced amount of data or control signals (in the upstream direction) to the IAB node 300-T or refrain from the transmission itself.

As illustrated in FIGS. 9A and 9B, the flow control is basically control between the IAB nodes 300. To avoid congestion between the IAB nodes, the IAB node 300-T may preferably report to the donor node 200. This is because, in response to receiving the report, the donor node 200 may be able to fundamentally solve the congestion between the IAB nodes 300 by changing a routing configuration, or the like. This also enables the entire topology to be optimized.

Therefore, in the first embodiment, the IAB node 300-T transmits, to the donor node 200, information collected by transmission or reception of the flow control feedback. Specifically, first, a relay node (e.g., the IAB node 300-T) transmits, to a donor node (e.g., the donor node 200), first information collected when transmitting the flow control feedback or second information collected when receiving a flow control feedback message. Second, the donor node receives the first information or the second information.

Note that the flow control feedback in the downstream direction may hereinafter be referred to as DL flow control feedback. The flow control feedback in the upstream direction may be referred to as UL flow control feedback. FIG. 9A illustrates an example of transmission of DL flow control feedback. FIG. 9B illustrates an example of transmission of UL flow control feedback.

Operation Example of First Embodiment

Figure 10:
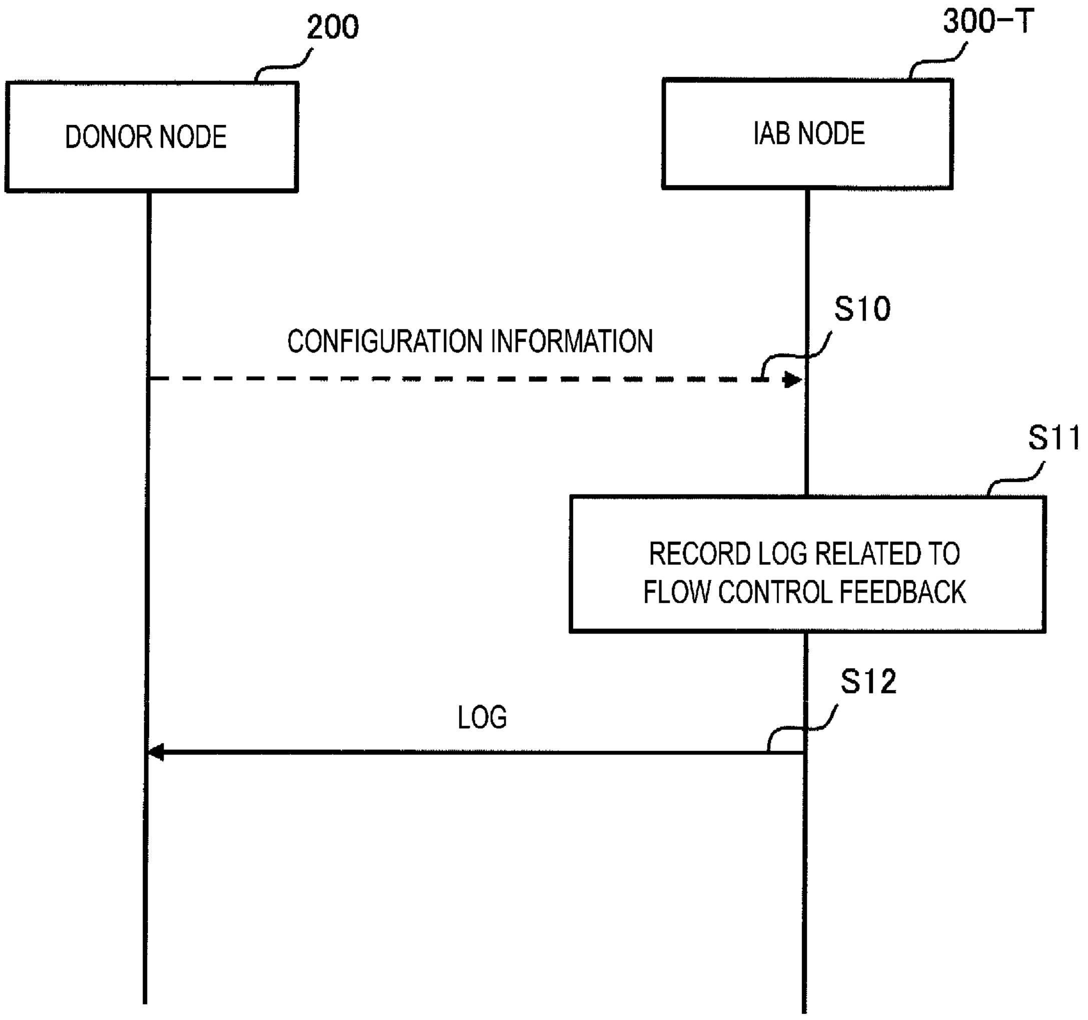
FIG. 10 is a flowchart illustrating an operation example according to the first embodiment.

FIG. 10 is a diagram illustrating an operation example according to the first embodiment.

As illustrated in FIG. 10, in step S10, the donor node 200 may transmit, to the IAB node 300, configuration information for recording a log relating to the flow control feedback. For example, the CU of the donor node 200 may transmit, to the IAB-MT of the IAB node 300, an RRC message including the configuration information. For example, the CU of the donor node 200 may transmit, to the IAB-DU of the IAB node 300, an F1AP message including the configuration information.

The configuration information may include the following information.

(A1) Information indicating whether to log the DL flow control feedback, log the UL flow control feedback, or log both types of flow control feedback.

(A2) Information indicating whether the transmission record of the flow control feedback is recorded as a log or as the reception record of the flow control feedback is recorded as a log, or both are recorded as a log.

(A3) Information indicating whether to record a buffer size (Available Buffer Size). The buffer size may correspond to a buffer size included in a BAP Control PDU when the flow control feedback is transmitted in the BAP Control PDU.

(A4) BH RLC Channel ID to be recorded as a log.

(A5) Recording trigger condition. A recording trigger condition is a trigger condition used when a log relating to the flow control feedback is recorded in a memory or the like. The recording trigger condition may be one of the following two conditions.

(A5-1) Periodic: A recording trigger condition used when a log is periodically recorded. The condition may include intervals (or a period) for regular recording, a recording period of time, and the like.

(A5-2) Event-triggered: A recording trigger condition that a log is recorded when an event occurs (event trigger). The event may correspond to the time when the flow control feedback is transmitted or the time when the flow control feedback is received. Alternatively, the event may correspond to the time when the DL flow control feedback is transmitted or the time when the DL flow control feedback is received. Alternatively, the event may correspond to the time when the UL flow control feedback is transmitted or the time when the UL flow control feedback is received.

(A6) Report trigger condition. A trigger condition under which the IAB node 300 reports (or transmits) an acquired log to the donor node 200. The report trigger condition may be the same as the recording trigger condition. The IAB node 300 reports (or transmits) a recorded log (or generated log) to the donor node 200 when the report trigger condition is met. In this case, the report trigger condition may correspond to the above-described immediate MDT. Alternatively, the report trigger condition may correspond to the donor node 200 (or another IAB node) making a query. The IAB node 300 may report (or transmit) a recorded log to the donor node 200 using, as the report trigger condition, the donor node 200 (or another IAB node) making a query. The report trigger condition in this case may correspond to the above-described log MDT.

(A7) Identifier of IAB Node to be measured. This indicates an identifier of a source IAB node or a destination IAB node of the flow control feedback received or transmitted by the IAB node 300. The IAB node 300 records only the processing related to the IAB node identifier. When the IAB node identifier is not configured, the IAB node 300 may record the processing related to all the IAB nodes.

In step S11, the IAB node 300 records a log relating to the flow control feedback. The IAB node 300 may record the log relating to the flow control feedback according to the configuration information configured by step S10.

The log relating to the flow control feedback may include the following information described in (B1) to (B6) below.

(B1) Information Obtained upon Receiving DL Flow Control Feedback. For example, in FIG. 9A, this information corresponds to the log obtained by the IAB node 300-P upon reception, by the IAB node 300-P, of the DL flow control feedback from the IAB node 300-T.

The information of the log obtained upon reception of the DL flow control feedback may specifically include the following.

(B1-1) Identification information of the source node (child node) of the DL flow control feedback. In FIG. 9A, when the IAB node 300-P receives the DL flow control feedback from the IAB node 300-T, this identification information corresponds to the identification information of the IAB node 300-T. The identification information may be a BAP address, a Cell-Radio Network Temporary Identifier (C-RNTI), or the like.

(B1-2) Available Buffer Size notified by the DL flow control feedback. As described above, since the DL flow control feedback includes the available buffer size, the IAB node 300 may record the available buffer size as a log. The IAB node 300 may record the buffer size for each BH RLF Channel ID.

(B1-3) Time stamp measured upon reception of the DL flow control feedback. For example, in FIG. 9A, this time stamp corresponds to a time stamp measured when the IAB node 300-P receives the DL flow control feedback from the IAB node 300-T.

(B1-4) Radio condition measured upon reception of the DL flow control feedback. For example, in FIG. 9A, this radio condition corresponds to a radio condition measured when the IAB node 300-P receives the DL flow control feedback from the IAB node 300-T. The radio condition may be represented by Reference Signal Received Power (RSRP), Reference Signal Received Quality (RSRQ), Signal to Interference & Noise Ratio (SINR), or the like.

Note that the IAB node 300 may record at least one of (B1-1) to (B1-4) in the memory as a log.

(B2) Information obtained upon reception of the UL flow control feedback. For example, in FIG. 9B, this information corresponds to the log obtained by the IAB node 300-C upon reception by the IAB node 300-C of the UL flow control feedback from the IAB node 300-T.

The information of the log obtained when the UL flow control feedback is received may specifically include the following.

(B2-1) Identification information of the source node (parent node) of the UL flow control feedback. In FIG. 9B, this identification information corresponds to the identification information of the IAB node 300-T upon reception, by the IAB node 300-C, of the UL flow control feedback from the IAB node 300-T. The identification information may be a BAP address, a cell ID, a gNB ID, or the like.

(B2-2) Available Buffer Size notified by the UL flow control feedback. For example, this buffer size may be the available buffer size included in the UL flow control feedback. The IAB node 300-C may record the buffer size for each BH RLF Channel ID.

(B2-3) Time stamp measured upon reception of the UL flow control feedback. For example, in FIG. 9B, this time stamp corresponds to the time stamp measured by the IAB node 300-C upon reception, by the IAB node 300-C, of the UL flow control feedback from the IAB node 300-T.

(B2-4) Radio condition measured upon reception of the UL flow control feedback. For example, in FIG. 9B, this radio condition corresponds to the radio condition measured by the IAB node 300-C upon reception, by the IAB node 300-C, of the UL flow control feedback from the IAB node 300-T. The radio condition may be represented by the RSRP, RSRQ, SINR, or the like.

Note that the IAB node 300 may record at least one of (B2-1) to (B2-4) in the memory as a log.

(B1) and (B2) may correspond to second information collected by the IAB node 300 upon reception of the flow control feedback message.

(B3) Information obtained upon transmission of the DL flow control feedback. For example, in FIG. 9A, this information corresponds to the log obtained by the IAB node 300-T upon transmission, by the IAB node 300-T, of the DL flow control feedback to the IAB node 300-P.

The information of the log obtained upon transmission of the DL flow control feedback may specifically include the following.

(B3-1) Identification information of the destination node (parent node) of the DL flow control feedback. In FIG. 9A, this identification information corresponds to the identification information of the IAB node 300-P which is the destination when the IAB node 300-T transmits the DL flow control feedback to the IAB node 300-P. The identification information may be a BAP address, a cell ID, a gNB ID, or the like.

(B3-2) Available Buffer Size of the IAB node itself. For example, this buffer size may be the available buffer size included in the DL flow control feedback. The IAB node 300-T may record the buffer size for each BH RLF Channel ID.

(B3-3) Time stamp upon transmission of the DL flow control feedback. For example, in FIG. 9A, this time stamp corresponds to the time stamp measure by the IAB node 300-T upon transmission of the DL flow control feedback to the IAB node 300-P.

(B3-4) Radio condition upon transmission of the DL flow control feedback. For example, in FIG. 9A, this radio condition corresponds to the radio condition measured by the IAB node 300-T upon transmission of the DL flow control feedback to the IAB node 300-P. The radio condition may be represented by the RSRP, RSRQ, SINR, or the like.

Note that the IAB node 300 may record at least one of (B3-1) to (B3-4) in the memory as a log.

(B4) Information upon transmission of the UL flow control feedback. For example, in FIG. 9B, this information corresponds to the log obtained by the IAB node 300-T upon transmission, by the IAB node 300-T, of the UL flow control feedback to the IAB node 300-C.

The information of the log obtained upon transmission of the UL flow control feedback may specifically include the following.

(B4-1) Identification information of the destination node (child node) of the UL flow control feedback. In FIG. 9B, this identification information corresponds to the identification information of the IAB node 300-C which is the destination when the IAB node 300-T transmits the UL flow control feedback to the IAB node 300-C. The identification information may be a BAP address, a C-RNTI, or the like.

(B4-2) Available Buffer Size of the IAB node itself. For example, this buffer size may be the available buffer size included in the UL flow control feedback. The IAB node 300-T may record the buffer size for each BH RLF Channel ID.

(B4-3) Time stamp measured upon transmission of the UL flow control feedback. For example, in FIG. 9B, this time stamp corresponds to the time stamp measured by the IAB node 300-T upon transmission of the UL flow control feedback to the IAB node 300-C.

(B4-4) Radio condition upon transmission of the UL flow control feedback. For example, in FIG. 9B, this radio condition may correspond to the radio condition measured by the IAB node 300-T upon transmission of the UL flow control feedback to the IAB node 300-C. The radio condition may be represented by the RSRP, RSRQ, SINR, or the like.

Note that the IAB node 300 may record at least one of (B4-1) to (B4-4) in the memory as a log.

(B3) and (B4) may correspond to the first information collected by the IAB node 300 upon transmission of the flow control feedback.

(B5) For the Periodic measurement, the following information may be regularly recorded as a log.

(B5-1) Available buffer size of the IAB node itself. The buffer size may be recorded for each BH RLF Channel ID.

(B5-2) Time stamp.

(B5-3) Radio condition. The radio condition may be represented by the RSRP, RSRQ, SINR, or the like.

Note that the IAB node 300 may record at least one of (B5-1) to (B5-3) as a log.

(B6) For other information, upon receiving flow control polling, the IAB node 300 may record the identifier of the source node as a log. The identifier may be a BAP address, a C-RNTI, a cell ID, or a gNB ID. The time stamp and/or the radio condition may be recorded, as a log, upon reception of the flow control polling by the IAB node 300.

Note that (B1) to (B6) described above may be processed as statistical information. For example, the number of times a certain IAB node 300 has received the flow control feedback from another IAB node may be recorded as a log. The number of times a certain IAB node 300 has transmitted the flow control feedback to other IAB nodes may be recorded as a log. The number of times of reception and the number of times of transmission may be the number of times during a certain period. The certain period of time may be configured by the donor node 200.

Referring back to FIG. 10, in step S12, the IAB node 300 transmits the log to the donor node 200.

First, when the configuration information is configured by step S10, the IAB node 300 transmits the log to the donor node 200 according to the configuration information. For example, when the report trigger condition is configured as the configuration information, the IAB node 300 transmits the recorded log to the donor node 200 according to the report trigger condition. Note that with the report trigger condition configured, the IAB node 300 may immediately transmit the acquired log to the donor node 200 without recording the acquired log in the memory (or while recording the acquired log in the memory).

Second, the IAB node 300 may transmit the recorded log to the donor node 200 in response to an indication (query message) from the donor node 200.

Note that the IAB-MT of the IAB node 300 may transmit the log by transmitting, to the CU of the donor node 200, an RRC message including the log. The IAB-DU of the IAB node 300 may transmit the log by transmitting, to the CU of the donor node 200, an FIAP message including the log.

Note that the donor node 200 may perform processing for changing the routing configuration for the IAB node 300 in response to the reception of the log. The change allows, for example, suppression of the congestion between the IAB nodes 300 and further optimization of the topology.

Second Embodiment

Now, a second embodiment will be described.

In the first embodiment, the logs collected upon transmission and/or reception of the flow control feedback is described. In the second embodiment, logs collected upon transmission and/or reception of a Type 2 BH RLF Indication will be described.

Figure 11:
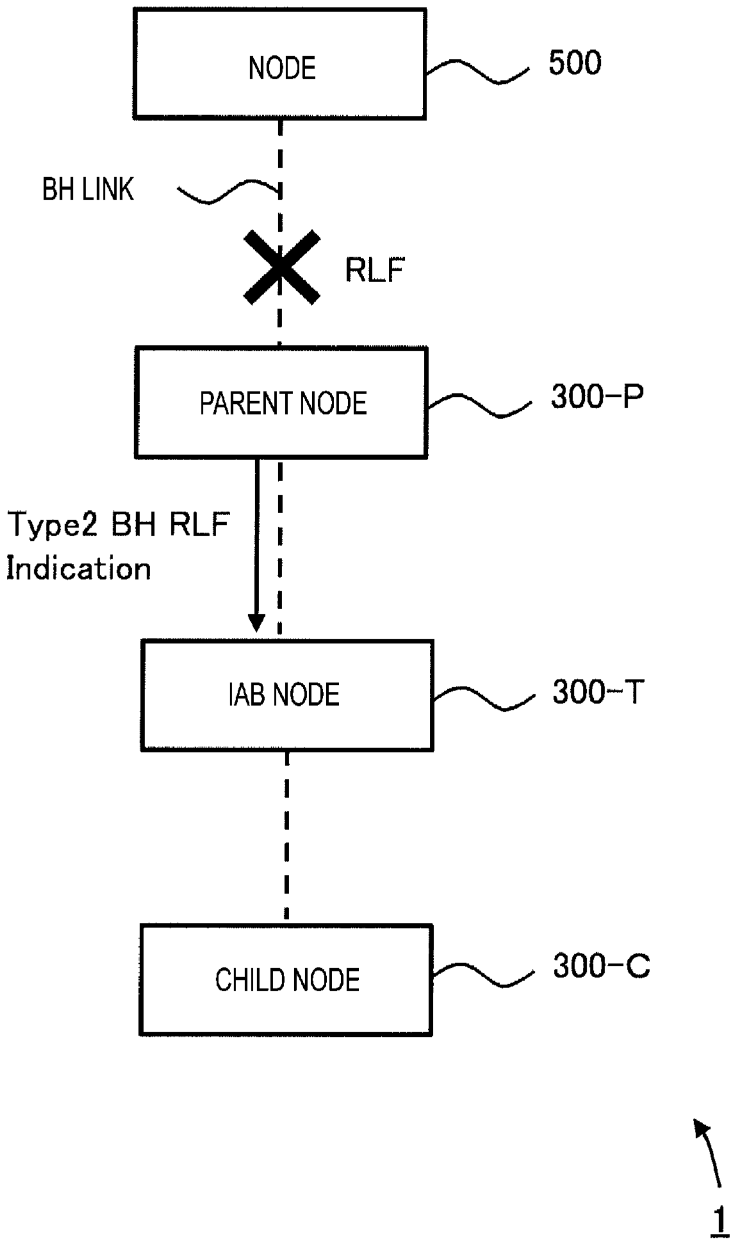
FIG. 11 is a diagram illustrating a configuration example of a cellular communication system according to a second embodiment.

FIG. 11 is a diagram illustrating a configuration example of a cellular communication system 1 according to the second embodiment.

As illustrated in FIG. 11, the cellular communication system 1 includes an IAB node 300-T, a parent node 300-P, a child node 300-C, and a node 500.

The parent node 300-P is a parent node of the IAB node 300-T and is an IAB node. The child node 300-C is a child node of the IAB node 300-T and is an IAB node as well. The node 500 is a parent node of the parent node 300-P and is the IAB node 300 or the donor node 200.

Here, a BH Radio Link Failure (RLF) is assumed to occur in the parent node 300-P. The BH RLF is a kind of line failure. FIG. 11 illustrates an example of a BH RLF (which may hereinafter be referred to as an "RLF") occurring in the BH link between the parent node 300-P and the node 500.

When the IAB-MT of the parent node 300-P detects a BH RLF, the IAB-DU of the parent node 300-P transmits a Type 2 BH RLF Indication (which may hereinafter be referred to as a "Type 2 Indication") to the IAB node 300-T. The Type 2 Indication is an example of a recovery attempt notification indicating that an attempt is being made to recover from an RLF.

Here, for example, it is assumed that when the IAB node 300-T detects an RLF in a BH link of the IAB node 300-T, the IAB-DU of the IAB node 300-T transmits an RRC reestablishment request to the CU of the donor node 200 due to the detection of the RLF. In this case, the donor node 200 can detect that the RLF occurs in the IAB node 300-T by receiving the RRC reestablishment request.

It is also assumed that, for example, when the IAB node 300-T detects an RLF in the BH link of the IAB node 300-T, the IAB-DU of the IAB node 300-T transmits an RLF Report to the CU of the donor node 200. In this case, in particular, the RLF report for MDT includes the latest radio measurement results for the serving cell and neighbor cells. Accordingly, by receiving the RLF report, the donor node 200 can detect in which cell the RLF has occurred.

However, as illustrated in FIG. 11, the IAB node 300-T detects no RLF in the IAB node 300-T even though the IAB node 300-T receives the Type 2 Indication. Accordingly, the IAB node 300-T cannot transmit the RRC reestablishment request or the RLF report.

On the other hand, as illustrated in FIG. 11, the parent node 300-P may transmit the RRC reestablishment request or the RLF report due to an RLF in the parent node 300-P. In this case, by receiving the RRC reestablishment request, the RLF report, or the like, the donor node 200 can predict that the parent node 300-P has transmitted the Type 2 Indication to the child node (IAB node 300-T) of the parent node 300-P.

However, when the IAB node 300-T transmits, to the child node 300-C of the IAB node 300-T, the Type 2 Indication received from the parent node 300-P, the donor node 200 fails to recognize the transmission of the Type 2 Indication. The donor node 200 also fails to recognize that the child node 300-C has received the Type 2 Indication transmitted from the parent node 300-P of the IAB node 300-T.

Here, the transmission, to the child node 300-C, of the Type 2 Indication received from the parent node 300-P by the IAB node 300-T is referred to as propagation of the Type 2 Indication. The transmission, by the child node 300-C, of the Type 2 Indication to a child node of the child node 300-C is also the propagation.

In other words, the donor node 200 fails to recognize whether the Type 2 indication has been propagated.

In a mobile IAB to be introduced in the future, as the IAB node 300 moves, the parent-child relationship between nodes also changes from moment to moment within a topology or between topologies. The mobile IAB is expected to further fail to recognize the propagation of the Type 2 Indication.

Accordingly, in the second embodiment, the IAB node 300-T transmits, to the donor node 200, the log collected by the IAP node 300-T upon transmission and/or reception of the Type 2 Indication. To be more specific, first, a relay node (for example, the IAB node 300-T) transmits, to a donor node (for example, the donor node 200), third information collected by the relay node upon reception, from a parent node (for example, the parent node 300-P), of a notification (for example, the Type 2 Indication) relating to a failure of a backhaul and fourth information collected by the relay node upon transmission of the notification to a child node (for example, the child node 300-C) of the relay node. Second, the donor node receives the third information and the fourth information.

Thus, the donor node 200 can obtain not only the third information but also the fourth information, enabling the topology to be optimized.

Operation Example According to Second Embodiment

Figure 12:
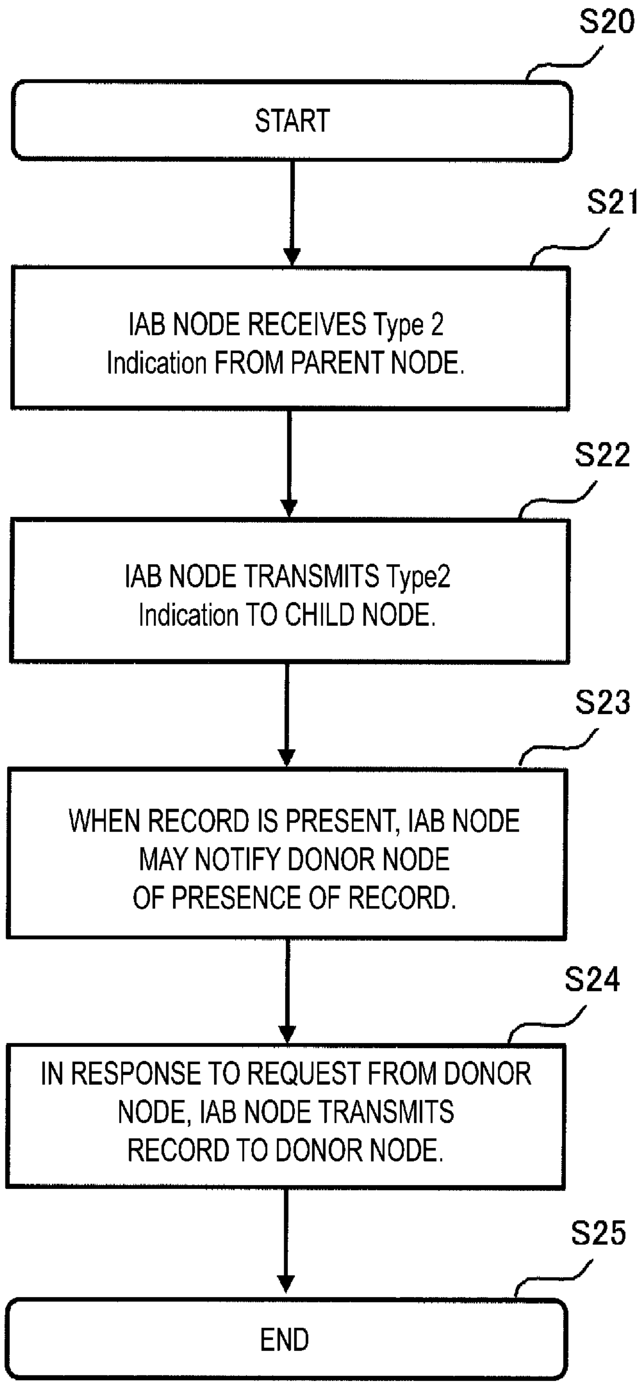
FIG. 12 is a diagram illustrating an operation example according to a second embodiment.

FIG. 12 is a diagram illustrating an operation example according to the second embodiment. The IAB node 300-T starts processing in step S20 as illustrated in FIG. 12.

In step S21, the IAB node 300-T receives the Type 2 Indication from the parent node 300-P. At this time, the IAB node 300-T obtains a log relating to the reception of the Type 2 Indication and records the log in the memory. As the information of the log, at least one of the following pieces of information (C1) to (C5) is recorded.

(C1) Information indicating that the Type 2 Indication has been received.

(C2) Identification information of the source (parent node) of the Type 2 Indication. For example, in the example in FIG. 11, this identification information corresponds to the identification information of the parent node 300-P when the IAB node 300-T receives the Type 2 Indication from the parent node 300-P. For example, in the example in FIG. 11, this identification information corresponds to the identification information of the IAB node 300-T when the child node 300-C receives the Type 2 Indication from the IAB node 300-T. The identification information may be a cell ID, a BAP address, or the like.

(C3) Information indicating whether propagation has been performed in association with the reception of the Type 2 Indication. In other words, information indicating whether the reception of the Type 2 Indication results from propagation is recorded as a log. For example, in the example in FIG. 11, when the IAB node 300-T receives the Type 2 Indication from the parent node 300-P, the IAB node 300-T records, as a log, information indicating that no propagation has been performed because the received Type 2 Indication has been transmitted due to a BH RLF in the parent node 300-P. For example, in the example in FIG. 11, when the child node 300-C receives the Type 2 Indication transmitted (or propagated) from the IAB node 300-T, the child node 300-C records, as a log, information indicating that the propagation has been performed.

(C4) Time stamp. For example, in the example in FIG. 11, this time stamp corresponds to the time stamp measured by the IAB node 300-T upon reception, by the IAB node 300-T, of the Type 2 Indication from the parent node 300-P.

(C5) Position information. Specifically, the position information may be at least one of latitude, longitude, altitude, an RF fingerprint, collected Wi-fi (registered trademark) information, and collected BT (Blue Tooth (registered trademark)) information.

Note that (C1) to (C5) described above may be statistically processed. For example, the information may be the number of receptions of the Type 2 Indication received from the parent node 300-P by the IAB node 300-T. For the number of receptions, a certain time period includes the receptions, and the certain time period may be configured by the donor node 200. Referring back to FIG. 12, the IAB node 300-T transmits the Type 2 Indication to the child node in step S22. At this time, the IAB node 300-T obtains a log relating to the transmission of the Type 2 Indication and records the log in the memory. As the information of the log, at least one of the following pieces of information (D1) to (D5) is recorded.

(D1) Information indicating that the Type 2 Indication has been transmitted.

(D2) Identification information of the destination (child node) of the Type 2 Indication.

For example, in the example in FIG. 11, this identification information corresponds to the identification information of the child node 300-C when the IAB node 300-T transmits the Type 2 Indication to the child node 300-C. The identification information may be a C-RNTI, a BAP address, or the like.

(D3) Information indicating, in association with the transmission of the Type 2 Indication, whether the transmission is propagation. In other words, information indicating whether the transmission of the Type 2 Indication results from propagation (or whether the transmission of the Type 2 Indication results from the reception of the Type 2 Indication from the parent node or a BH RLF of the node itself) is recorded as a log. For example, in the example in FIG. 11, when transmitting, to the child node 300-C, the Type 2 Indication received from the parent node 300-P, the IAB node 300-T records, as a log, information indicating that the transmission is propagation. On the other hand, for example, in the example in FIG. 11, when transmitting the Type 2 Indication, the parent node 300-P records, as a log, information indicating that the transmission is not propagation because the parent node 300-P transmits the Type 2 Indication due to a BH RLF in the parent node 300-P.

(D4) Time stamp. For example, in the example in FIG. 11, this time stamp corresponds to the time stamp measured by the IAB node 300-T upon transmission of the Type 2 Indication to the child node 300-C.

(D5) Position information. Specific information may be the same as (C5).

Note that (D1) to (D5) described above may be statistically processed. For example, the information may be the number of transmissions of the Type 2 Indication transmitted from the IAB node 300-T to the child node 300-C. For the number of transmissions, a certain time period includes the transmissions, and the certain time period may be configured by the donor node 200.

Referring back to FIG. 12, in step S23, when a record is present in the memory as a log, the IAB node 300-T may transmit the presence of the record to the donor node 200. For example, the IAB-MT of the IAB node 300-T may transmit, to the CU of the donor node 200, an RRC message including information indicating the presence of the record. For example, the IAB-DU of the IAB node 300-T may transmit, to the CU of the donor node 200, an F1AP message including information indicating the presence of the record.

In step S24, in response to a request from the donor node 200, the IAB node 300-T transmits the recorded log to the donor node 200. The request may also be transmitted by the RRC message or F1AP message including the request, or the like. The log may also be transmitted by an RRC message, an F1AP message, or the like including information recorded as the log.

Note that the third information may correspond to the information relating to the log obtained or collected by the IAB node 300-T upon reception of the Type 2 Indication (step S21). The fourth information may correspond to information relating to the log obtained or collected by the IAB node 300-T upon transmission of the Type 2 Indication (step S22). In step S24, the IAB node 300-T transmits the third information and the fourth information.

Then, in step S25, the IAB node 300-T ends a series of processing operations.

Variation of Second Embodiment

In the second embodiment, the Type 2 indication has been described. For example, as a variation, a Type 3 BH RLF Indication (which may hereinafter be referred to as a "Type 3 Indication") may be used instead of the Type 2 Indication. The Type 3 Indication is a recovery notification indicating that the IAB node 300-T has recovered from a BH RLF. In other words, upon receiving the Type 3 Indication from the parent node 300-P, the IAB node 300-T may record at least one of (C1) to (C5) as a log. Upon transmitting the Type 3 Indication to the child node 300-C, the IAB node 300-T may record at least one of (D1) to (D5) as a log.

As a variation, instead of the Type 2 Indication, a Type 1 BH RLF Indication (which may hereinafter be referred to as a "Type1 Indication") may be used. The Type 1 Indication is an example of a failure occurrence notification indicating the occurrence of a BH RLF. This is because when a BH RLF occurs, the IAB node 300 immediately performs an operation of recovering from the failure, and thus the Type 2 Indication and the Type 1 Indication can be regarded as the same.

In the second embodiment, an example has been described in which the IAB node 300-T records information in the memory as a log and transmits the recorded information to the donor node 200. For example, upon receiving the Type 2 Indication as an event trigger, the IAB node 300-T may collect information as a log and immediately transmit the collected information to the donor node 200 without recording the collected information in the memory (or while recording the collected information in the memory). For example, upon transmitting the Type 2 Indication as an event trigger, the IAB node 300-T may collect information as a log and immediately transmit the collected information to the donor node 200 without recording the collected information in the memory (or while recording the collected information in the memory). Such configuration may also be performed by the donor node 200.

Other Embodiments

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing processing performed by the UE 100 or the gNB 200 may be integrated, and at least a part of the UE 100 or the gNB 200 may be implemented as a semiconductor integrated circuit (chipset, system on a chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Although embodiments have been described in detail with reference to the drawings, a specific configuration is not limited to those described above, and various design modifications and the like can be made without departing from the scope of the present disclosure. All of or a part of the embodiments can be combined together as long as no inconsistencies are introduced.

REFERENCE SIGNS

1: Cellular communication system
10: 5GC
100: UE
110: Wireless communicator
120: Controller
200 (200-1,200-2): gNB (donor node)
210: Wireless communicator
220: Network communicator
230: Controller
300 (300-1, 300-2, 300-P, 300-T, 300-C): IAB node
310: Wireless communicator
320: Controller

The invention claimed is:

1. A communication control method used in a cellular communication system, the communication control method comprising:

receiving, by a radio node, configuration information for recording log information relating to a predetermined feedback message from a network node; and transmitting, by the radio node, to the network node, the predetermined feedback message including the log information collected until transmitting the predetermined feedback message, wherein the configuration information includes first time information for triggering transmission of the predetermined feedback message, and the log information includes information relating to second time information different to the first time information and information relating to an available buffer size.

2. The communication control method according to claim 1, wherein the predetermined feedback message is a downlink flow control feedback message or an uplink flow control feedback message.

3. A radio node in a cellular communication system, the radio node comprising a transceiver circuitry, a receiver circuitry, and a processing circuitry operatively associated with the transceiver circuitry and the receiver circuitry and configured to execute processing of:

receiving configuration information for recording log information relating to a predetermined feedback message from a network node; and transmitting to the network node, the predetermined feedback message including the log information collected until transmitting the predetermined feedback message, wherein the configuration information includes first time information for triggering transmission of the predetermined feedback message, and the log information includes information relating to second time information different to the first time information and information relating to an available buffer size.

* * * * *